United States Patent
Fry et al.

(10) Patent No.: US 12,049,205 B2
(45) Date of Patent: Jul. 30, 2024

(54) TRAILER BRAKING SYSTEM

(71) Applicant: KNORR-BREMSE Systeme fuer Nutzfahrzeuge GmbH, Munich (DE)

(72) Inventors: Matthew Fry, Munich (DE); Martin Mederer, Munich (DE); Stefan Pahl, Munich (DE); Florian Finkl, Munich (DE); Thomas Steer, Munich (DE); Christian Staahl, Munich (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 360 days.

(21) Appl. No.: 17/594,877

(22) PCT Filed: May 3, 2020

(86) PCT No.: PCT/EP2020/062228
§ 371 (c)(1),
(2) Date: Nov. 2, 2021

(87) PCT Pub. No.: WO2020/225167
PCT Pub. Date: Nov. 12, 2020

(65) Prior Publication Data
US 2022/0219663 A1  Jul. 14, 2022

(30) Foreign Application Priority Data
May 3, 2019  (GB) .................................... 1906303

(51) Int. Cl.
*B60T 13/68* (2006.01)
*B60T 7/20* (2006.01)
(Continued)

(52) U.S. Cl.
CPC .............. *B60T 13/683* (2013.01); *B60T 7/20* (2013.01); *B60T 13/662* (2013.01); *B60T 15/027* (2013.01);
(Continued)

(58) Field of Classification Search
CPC .... B60T 13/662; B60T 13/686; B60T 15/027; B60T 2270/402; B60T 2270/413; B60T 7/20
(Continued)

(56) References Cited

U.S. PATENT DOCUMENTS 5,549,362 A    8/1996  Broome
6,209,966 B1*  4/2001  Mies ....................... B60T 8/326
                                                          303/3

(Continued)

FOREIGN PATENT DOCUMENTS

CN    101795911 A    8/2010
CN    103303287 A    9/2013
(Continued)

OTHER PUBLICATIONS

Chinese-language Office Action issued in Chinese Application No. 202080033455.7 dated Mar. 8, 2023 with English translation (11 pages).

(Continued)

*Primary Examiner* — Christopher P Schwartz
(74) *Attorney, Agent, or Firm* — Crowell & Moring LLP

(57) ABSTRACT

A brake system is provided for a trailer vehicle having a plurality of axles, each of which has a wheel end on a respective side of the vehicle, the brake system including first and second pneumatic circuits for supplying air pressure to brake devices at the wheel ends. The system includes a spring brake modulator valve arrangement adapted to control pressure to spring brakes on the vehicle, which modulator valve arrangement receives an input from at least one of the pneumatic circuits and a control pressure from the trailer brake module. Flow of air to the brakes is controllable either by the trailer brake module or by the spring brake modulator valve arrangement to provide redundancy.

9 Claims, 5 Drawing Sheets

(51) Int. Cl.
*B60T 13/66* (2006.01)
*B60T 15/02* (2006.01)

(52) U.S. Cl.
CPC ... *B60T 2270/402* (2013.01); *B60T 2270/413* (2013.01)

(58) Field of Classification Search
USPC .................................................. 303/123, 127
See application file for complete search history.

(56) References Cited

U.S. PATENT DOCUMENTS

| | | | |
|---|---|---|---|
| 6,272,417 B1* | 8/2001 | Ross | B60T 8/361 |
| | | | 701/80 |
| 11,738,730 B2* | 8/2023 | Mellings | B60T 13/58 |
| | | | 303/14 |
| 2005/0162006 A1 | 7/2005 | Nilsson et al. | |
| 2010/0269690 A1 | 10/2010 | Lanquetot et al. | |
| 2013/0241276 A1 | 9/2013 | Kim et al. | |
| 2017/0096127 A1 | 4/2017 | Zhang et al. | |
| 2017/0267221 A1 | 9/2017 | Hecker et al. | |
| 2018/0001879 A1 | 1/2018 | Witte | |
| 2019/0118786 A1 | 4/2019 | Wulf | |
| 2020/0148180 A1* | 5/2020 | Van Thiel | B60T 13/263 |
| 2022/0144232 A1* | 5/2022 | Van Thiel | B60T 13/662 |
| 2022/0340111 A1* | 10/2022 | Fry | B60T 8/1708 |

FOREIGN PATENT DOCUMENTS

| | | |
|---|---|---|
| CN | 106232446 A | 12/2016 |
| CN | 107206995 A | 9/2017 |
| CN | 109195844 A | 1/2019 |
| DE | 10 2009 031 785 A1 | 1/2011 |
| DE | 10 2014 013 756 B3 | 2/2016 |
| DE | 10 2017 118 529 A1 | 2/2019 |
| EP | 0 586 203 A2 | 3/1994 |
| EP | 1 538 054 A2 | 6/2005 |
| EP | 2 459 421 B1 | 3/2013 |
| EP | 3 444 155 A1 | 2/2019 |
| EP | 3 444 155 B1 | 8/2020 |
| GB | 2 448 007 A | 10/2008 |
| GB | 2 505 948 A | 3/2014 |
| GB | 2 557 424 A | 6/2018 |
| WO | WO 2008/117038 A1 | 10/2008 |

OTHER PUBLICATIONS

International Search Report (PCT/ISA/210) issued in PCT Application No. PCT/EP2020/062228 dated Jul. 29, 2020 (two (2) pages).
Written Opinion (PCT/ISA/237) issued in PCT Application No. PCT/EP2020/062228 dated Jul. 29, 2020 (five (5) pages).
Search Report issued in Great Britain Application No. GB1906303.1 dated Oct. 4, 2019 (two (2) pages).

* cited by examiner

1-Channel SBMV

2-Channel SBMV

TRAILER BRAKING SYSTEM

BACKGROUND AND SUMMARY OF THE INVENTION

The invention relates to a braking system, in particular for a towed vehicle such as a three axle semi-trailer or full trailer.

Motor vehicle technology is increasingly making use of digitization and one of the main strands of development is in the area of autonomous or highly automated vehicles, in which functions currently carried out by the driver will be replaceable by automated systems on the vehicle. This automation generally requires integration of additional functions sensors and electrical and electronic subsystems. As vehicles are more fully automated, the general acceptance of, or at least toleration of, road accidents will drop significantly as errors by machines or electronic are less accepted than the generic problem of driver error.

An additional issue for operators is that the trailer will become more expensive as a capital good, even if total operational costs are reduced, and so there will be pressure on the owner to increase the availability of the trailer for use. Therefore, compared to known trailer vehicles, the level of safety should be increased and the availability, performance of critical functions ensured and error rates reduced.

Problems with trailer safety systems can be generally divided into pneumatic problems or errors and electrical problems or errors. Examples of pneumatic problems include: decoupling or rupture of the supply, which will lead to the triggering of the emergency brake; rupture of the control line, which will lead to the triggering of the emergency brake via the truck trailer control module; rupture of the main reservoir on the trailer leading to decompression of the supply line, which if the leak is large enough will lead to the emergency brake being triggered; and, finally, failure of a valve or similar, which will result in one of the typically two brake channels being unable to sustain the intended brake pressure, which in turn leads to asymmetric brake forces and potential vehicle instability.

Examples of modes of electrical failure include a failure of the power supply e.g. due to a disconnected cable or an ECU failure. In either case, the electronic braking system operation would be inoperative with the loss of ABS and RSP functions and brake response times increased.

In an automated driving use case any single fault described above would force the vehicle combination to an uncontrolled and immediate stop (potentially causing an accident), a severe speed reduction and/or stop on the Highway or a loss of legally required braking functionality (ABS, RSP) and a potentially dangerous condition of the vehicle when emergency brake actuations or braking in non-optimal conditions is required.

GB2557424 discloses a known braking system in which a commercial vehicle electronic braking and communication system for a trailer has a connector to connect the system to a prime mover. The connector comprises an electronic control module with a first ISO7638 compliant databus connection, which carries braking related data signals and to which a brake pressure control device is attached. The connector also comprises a second databus ISO12098 compliant connection, which carries data relating to non-braking functions, such as lighting, camera, object detection (radar, lidar, ultrasonic). The trailer braking and communication system may act as a combined brake, brake and chassis control, lighting and autonomous driving controller.

A further known trailer braking system is disclosed in GB2505948.

EP1538054 discloses a brake system with a service brake unit with a first brake circuit, and a parking brake unit with a second circuit, for wheels on an axle. A control device prevents locking of at least one wheel due to a pressure drop in the second circuit, while the vehicle is in motion. The device acts on a shuttle valve with an input, which is connected to an output of the first brake circuit on one side of the vehicle only, and to all outputs of the second circuit. The speed of the wheels is measured by a speed sensor on at least one wheel, or by two sensors on two wheels of the same axle.

The present invention aims to improve vehicle brake system performance in the event of failures.

According to the invention there is provided a trailer braking system for a trailer vehicle having a plurality of axles, each of which axles has a wheel end on a respective side of the vehicle, the brake system comprising first and second pneumatic circuits for supplying air pressure to brake devices at the wheel ends, the air pressure to the wheel ends being controllable by way of a trailer brake module having a first brake ECU being part of a trailer brake module, wherein the system further comprises a spring brake modulator valve arrangement adapted to control pressure to spring brakes on the vehicle, which modulator valve arrangement receives an input from at least one of said pneumatic circuits and a control pressure from the trailer brake module, wherein flow of air to the brakes is controllable either by the trailer brake module or by the spring brake modulator valve arrangement, which arrangement is configured to receive electrical signals from a second ECU independently operable from the first brake ECU.

Preferred aspects of the invention can be found in the claims

The invention advantageously makes use of the spring brake portion that is already installed in standard vehicles, or additionally installed spring brake portions, to provide redundancy in the brake system. The brake force is controlled by modulation of the air pressure in spring brake portion of the brake system using a valve arrangement.

Exemplary embodiments of the invention, in which like parts are described with like numbers, will now be described in greater detail.

DETAILED DESCRIPTION OF THE DRAWINGS

Figure 1:
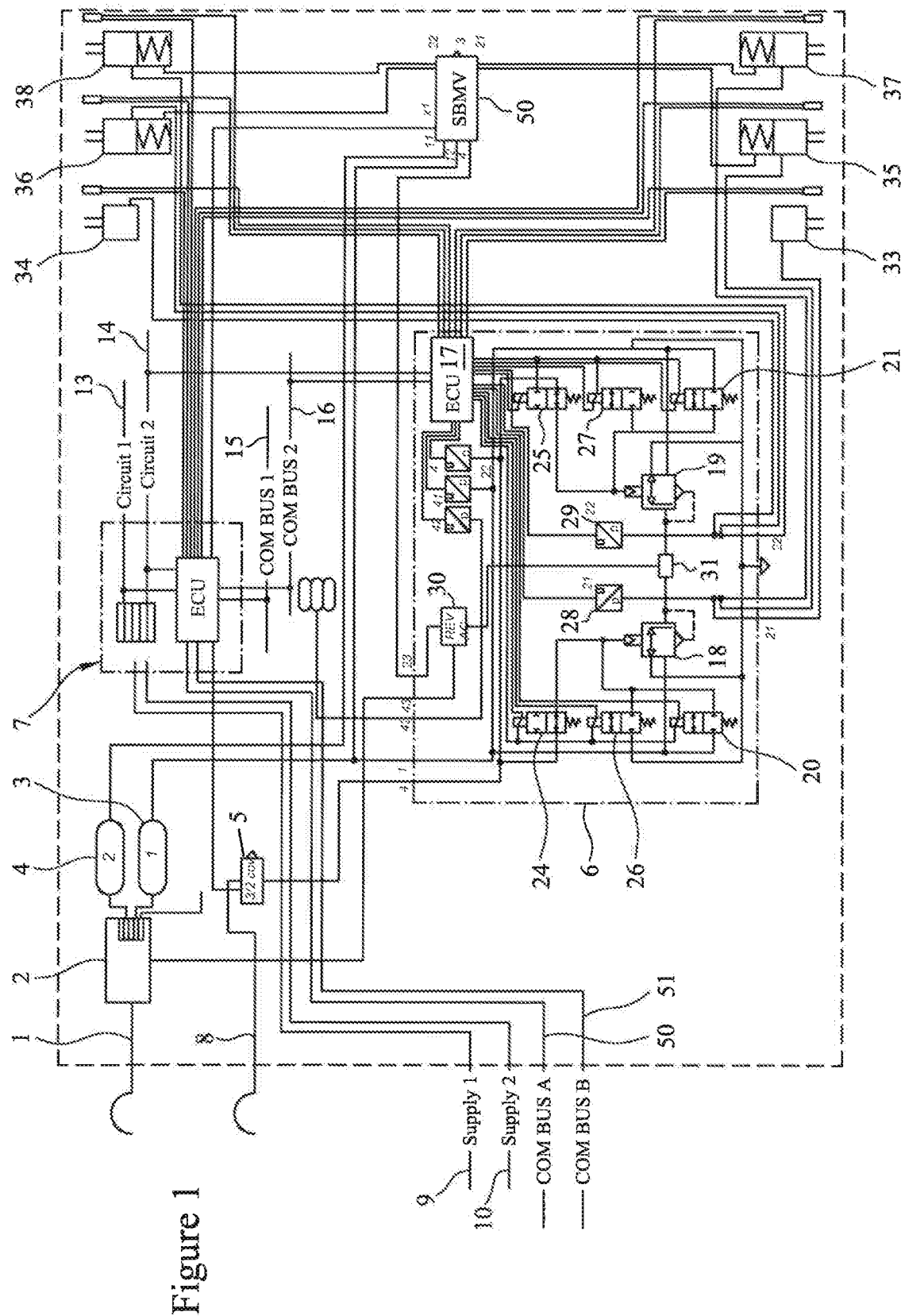
FIG. 1 shows a first embodiment of a trailer brake system with redundancy.

FIG. 1 shows a block diagram of a redundant trailer brake system comprising a first pneumatic connection 1 for service braking (dark line) connected to a selector valve 2, which controls air flow in use into first and second reservoirs 3, 4, arranged in parallel to one another and a further output to a relay emergency valve anti-compounding valve 30, which forms part of the trailer brake module described below.

The trailer brake system further comprises a second pneumatic connection 8 for control (light line), which is connected to the trailer brake module 6 via a 3/2 cut off solenoid valve 5, which is used to shut down pneumatic functionality of the trailer brake module by cutting of control line pressure to the trailer brake module.

The trailer brake system further comprises a second pneumatic connection 8 for control (light line), which is connected to the primary trailer brake module 6. First and second electrical connections 9, 10 supply power to the main electronic control unit (ECU) 7. The system is further provided with first and second communication bus connections 50, 51 towards the towing vehicle connected to main ECU 7. It will be appreciated that the first electrical connection 9 and the first communication bus 50 may be combined in a single electrical connector such as the ISO7638 and the second electrical connection 10 and the second communication bus 51 may be combined in a single electrical connector such as the ISO12098. The main ECU 7 provides power management of the first and second electrical connection 9, 10 and provides two local trailer power circuits 13, 14 where circuit-2 14 provides power to the primary brake control module 6. The main ECU 7 additionally provides first and second local communication circuits 15, 16 and is the gateway between the local buses and first and second communication buses.

The ECU 7 is operatively connected to the selector 5 to provide the necessary control signals.

The trailer brake module 6 receives a first pneumatic inputs from the first reservoir, which input is connected to a respective relay valve 18, 19 and a respective 3/2 solenoid back up valve 20, 21. The said pneumatic connection is provided with a respective pressure transducer 22, which is electrically connected to the main ECU 17. The relay emergency anti compounding valve 30, which is also connected to a shuttle valve 31 located pneumatically between the two relay valves 18, 19. A further transducer 32 is provided on the control line input, which transducer is connected to the main ECU 17.

On each of the two brake channels a respective further two 2/2 solenoid backup valve 24, 25 are provided and each of the backup valves is connected to a respective load valves 20, 21 and exhaust valve 26, 27, which are connected to a conduit to exhausts. The solenoid valves pilot the two relay valves 18, 19, the outputs of which are supplied to ports 21 22 to provide the pressure to the trailer brakes. A respective transducer 28, 29 is provided in the pneumatic pathway from the relay valve to the brake channels, with the transducer electrical signals being connected to the ECU 17. Each of the back-up, load and exhaust valves is controlled from the ECU 17 by way of respective electrical connections.

In the illustrated embodiment the trailer is provided with three axles having a respective brakes 33-38 on each wheel end. Axles 2 and 3 (the two rear axles) are each provided with a spring brake, which is pneumatically connected to the output of the relay emergency anti-compounding valve 30, so that the spring brakes can be independently controlled. A wheel speed sensor is associated with each wheel end, the output of which for axle 1 is passed to the main ECU 7, axles 2 and 3 are passed to the primary trailer brake module ECU 17.

The first and second reservoirs are in fluid connection with the spring brake modulator valve arrangement 50 shown here schematically. There is a further conduit between the spring brake modulator valve 50 and the relay emergency valve 30.

In the illustrated embodiment the trailer is provided with three axles having a respective brakes 33-38 on each wheel end. The two rear axles are each provided with a spring brake, which is pneumatically connected to the output of the spring brake modulator 50, so that the spring brakes can be independently controlled. A wheel speed sensor is associated with each wheel end, the output of which is passed to the main ECU 17 as well as the main ECU 7.

Control of the flow of air to the spring brakes can be made either by the trailer brake module or by the spring brake control module, which is configured to receive electrical signals from the main ECU 7.

In the event of a failure, the ECU 17 can close off control line input to the trailer brake module 6 by means of the selector valve 5 so as to prevent the pneumatic output. For instance in case of an electronic fault in TBM this is important as the output pressure to the service brake cannot be reduced, so that e.g. ABS would not be possible.

As the ECU 7 integrates or processes all necessary brake system relevant sensor input (e.g. acceleration, wheel speeds) it can perform brake and stability management using the spring brake modulator valve 50, which provides a redundancy mode in the system.

With this mode all of the faults outlined above brake functionality can be maintained as the vehicle still has full graduable brake and stability functionality. The brakes do not have to be applied via emergency function in case of a single pneumatic failure. Instead the safety of the vehicle is ensured. The emergency functionality can be provided in case of two severe failures, as a second level of redundancy.

Figure 2:
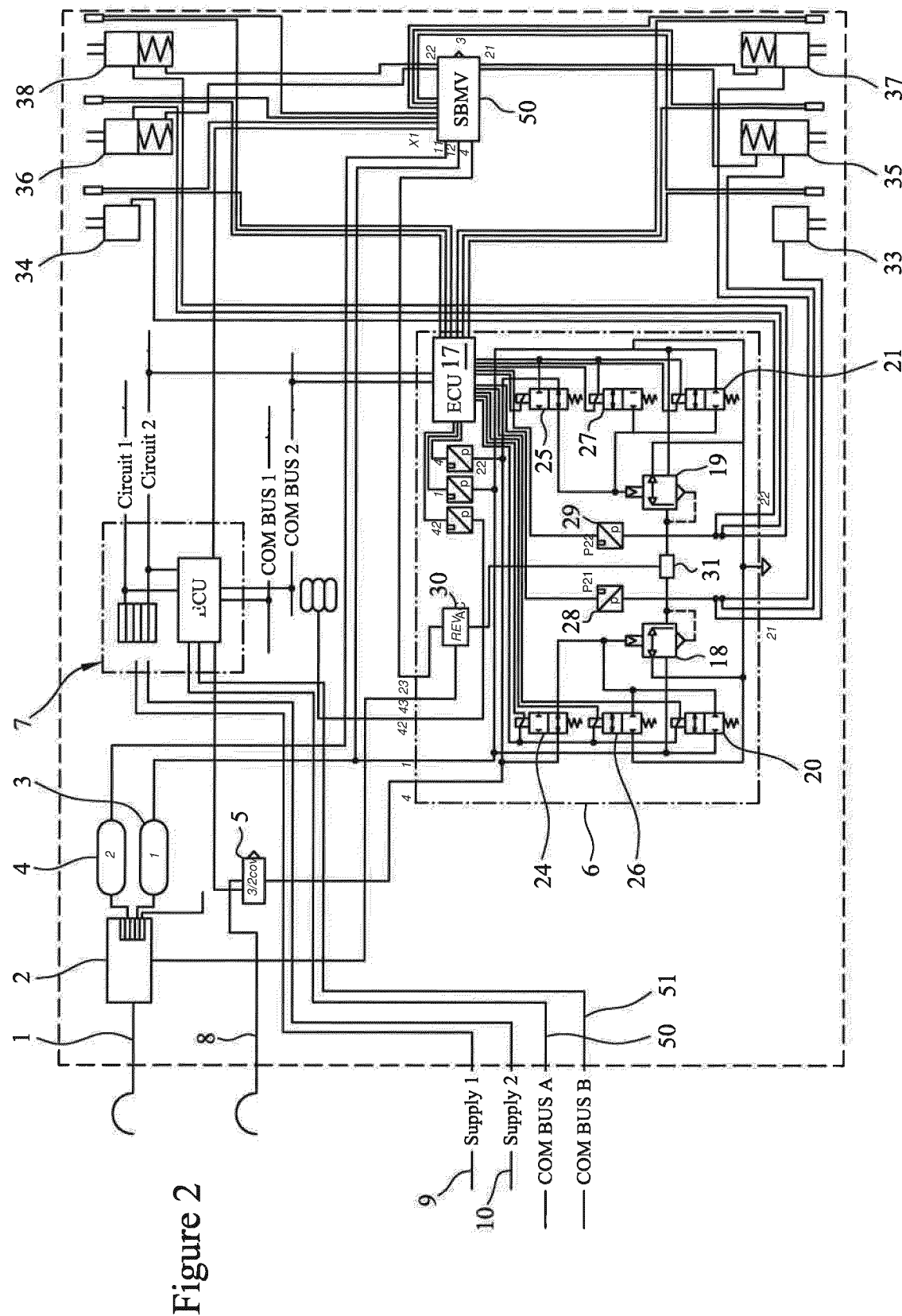
FIG. 2 shows a second embodiment of a trailer brake system.

FIG. 2 shows an alternative embodiment to FIG. 1 in which the wheel speed sensors are connected to the spring brake modulator valve ECU rather than the ECU 7.

Figure 3:
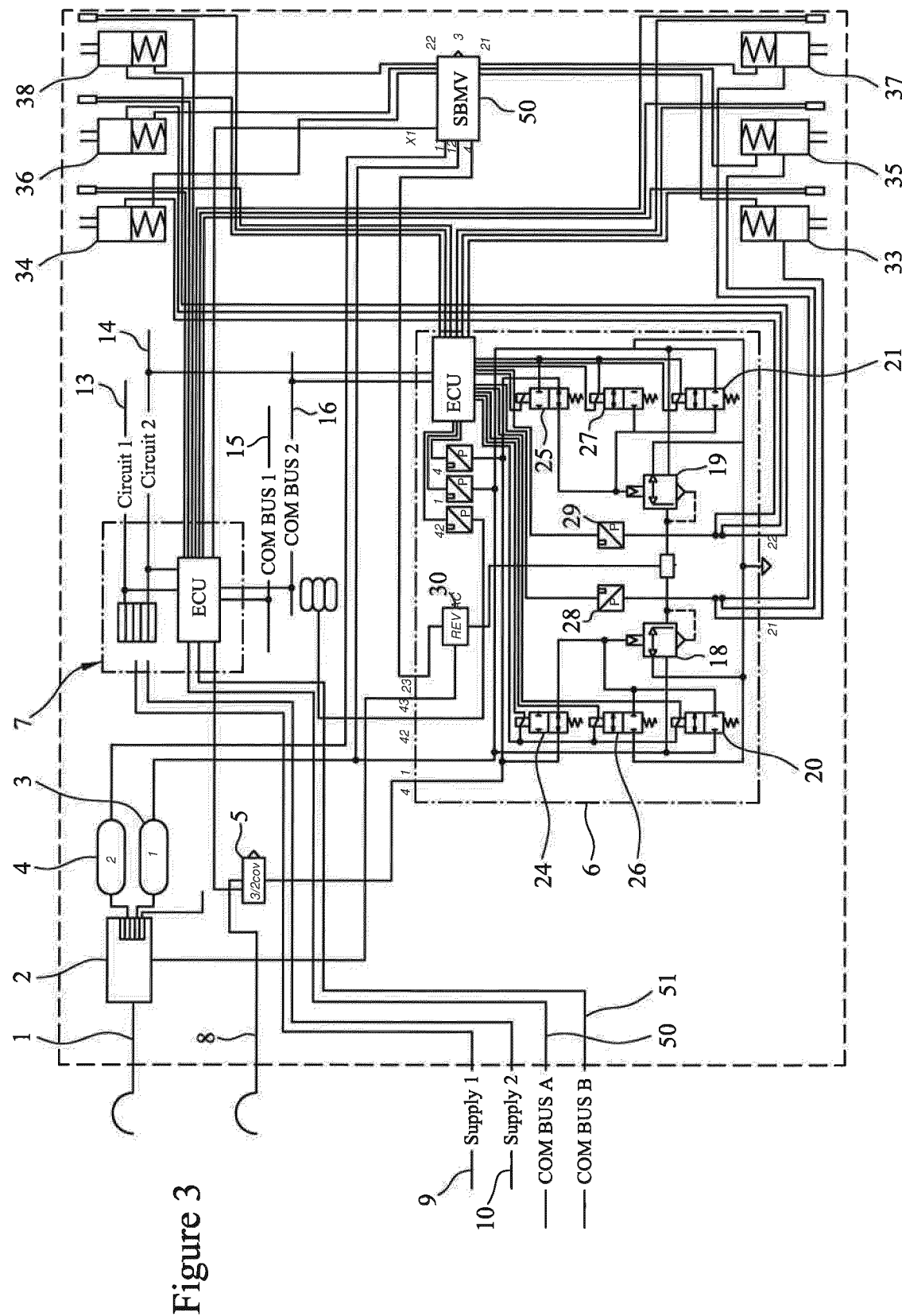
FIG. 3 shows a third embodiment of a trailer brake system.

FIG. 3 shows a further alternative embodiment, in which all three axles are provided with spring brakes and the spring brake modulator valve is connected to each of the six spring brakes.

Figure 4:
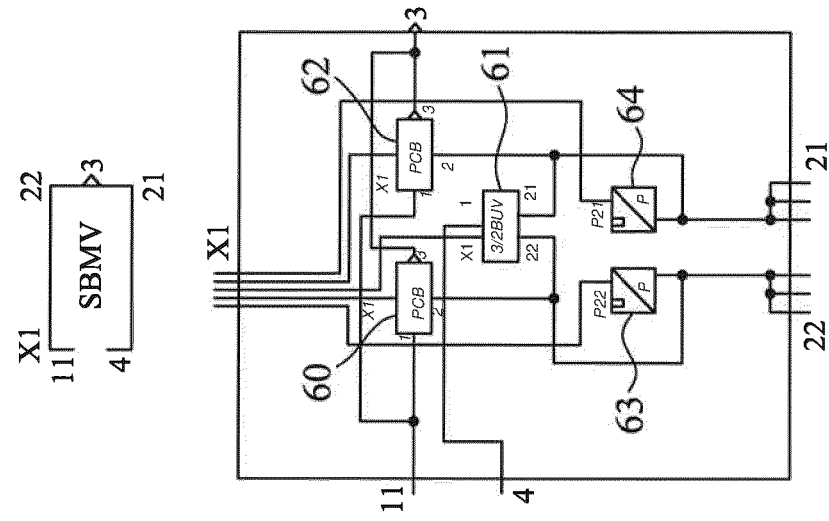
FIG. 4 shows a fourth embodiment of a trailer brake system.

FIG. 4 shows a single channel spring brake modulator valve comprising a pressure control block 60, which receives a pressure supply from the main brake control line (redline) and a 2/2 back up valve 61 which receives a control pressure from the control line emergency and anti-compounding output of the trailer brake module. The outputs of the pressure control block and back up valve are connected to the spring brakes. The pressure control block comprises a normally closed 2/2 valve and the back up valve is a normally open 2/2 valve. Electrical connections from the ECU 7 are provided.

In normal operation the normally open 2/2 valve connects the input port 4 to the outputs 21 and 22. Depending on the input this would either keep the spring brakes released or apply them. The normally closed pressure control block shuts off input port 11 and exhaust port 3. In redundancy mode, the 2/2 valve shuts off input 4 and the pressure control block can modulate output pressure. With this SBMV electronically wheel speed controlled braking as well as 1-Channel ABS and RSP is possible in redundancy mode.

Figure 5:
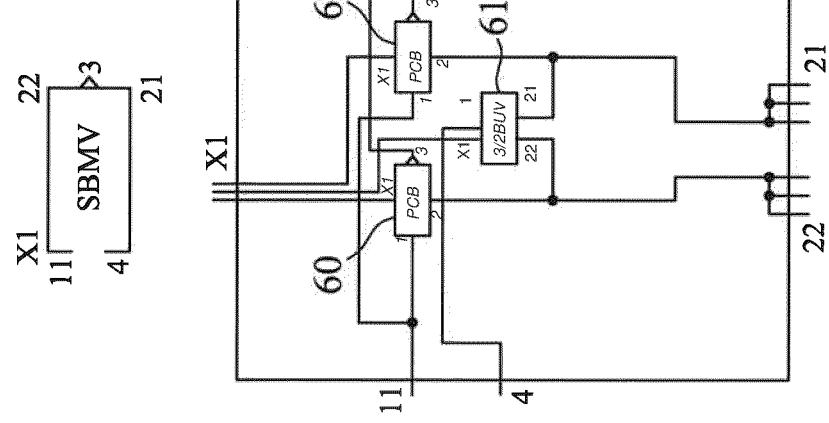
FIG. 5 shows a fifth embodiment of a trailer brake system.
Figure 6:
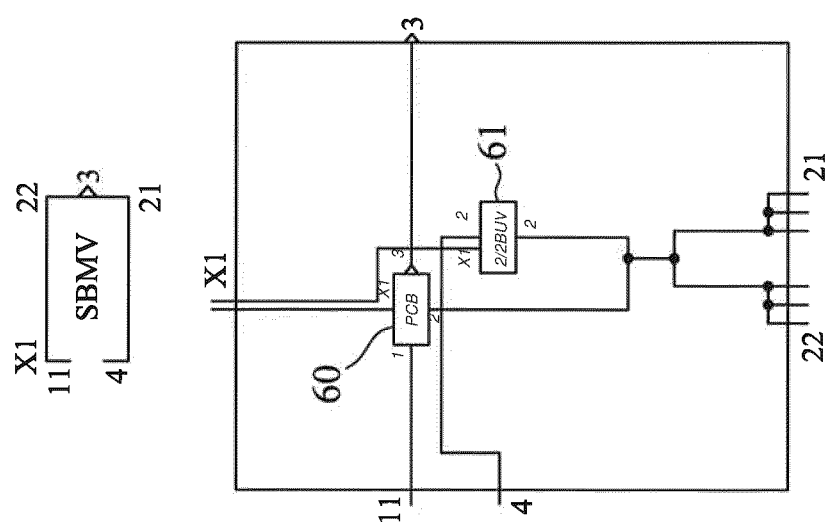
FIG. 6 shows a sixth embodiment of a trailer brake system.

FIG. 5 show a two channel variant of the spring brake modulator valve in which the back up valve is a 3/2 valve instead of the 2/2 valve of the embodiment of FIG. 4 to control connecting input port 4 to outputs 21 and 22. An additional pressure control block 62 is provided which enables a separation of output 21 from output 22 to provide two channel braking. In this embodiment electronically wheel speed controlled braking as well as 2-Channel ABS and RSP is possible in redundancy mode FIG. 6 shows a two channel spring brake modulator valve with pressure sensors. It would be possible to implement a similar arrangement in a single channel arrangement. In this embodiment pressure sensors 63, 64 are provided in the output channels 21, 22. This enables the measurement of the output pressure and to provide a target value for a pressure control loop. In this embodiment electronically and load dependent controlled braking as well as 2-Channel ABS and RSP is possible in redundancy mode.

Figures 7, 8, 9:
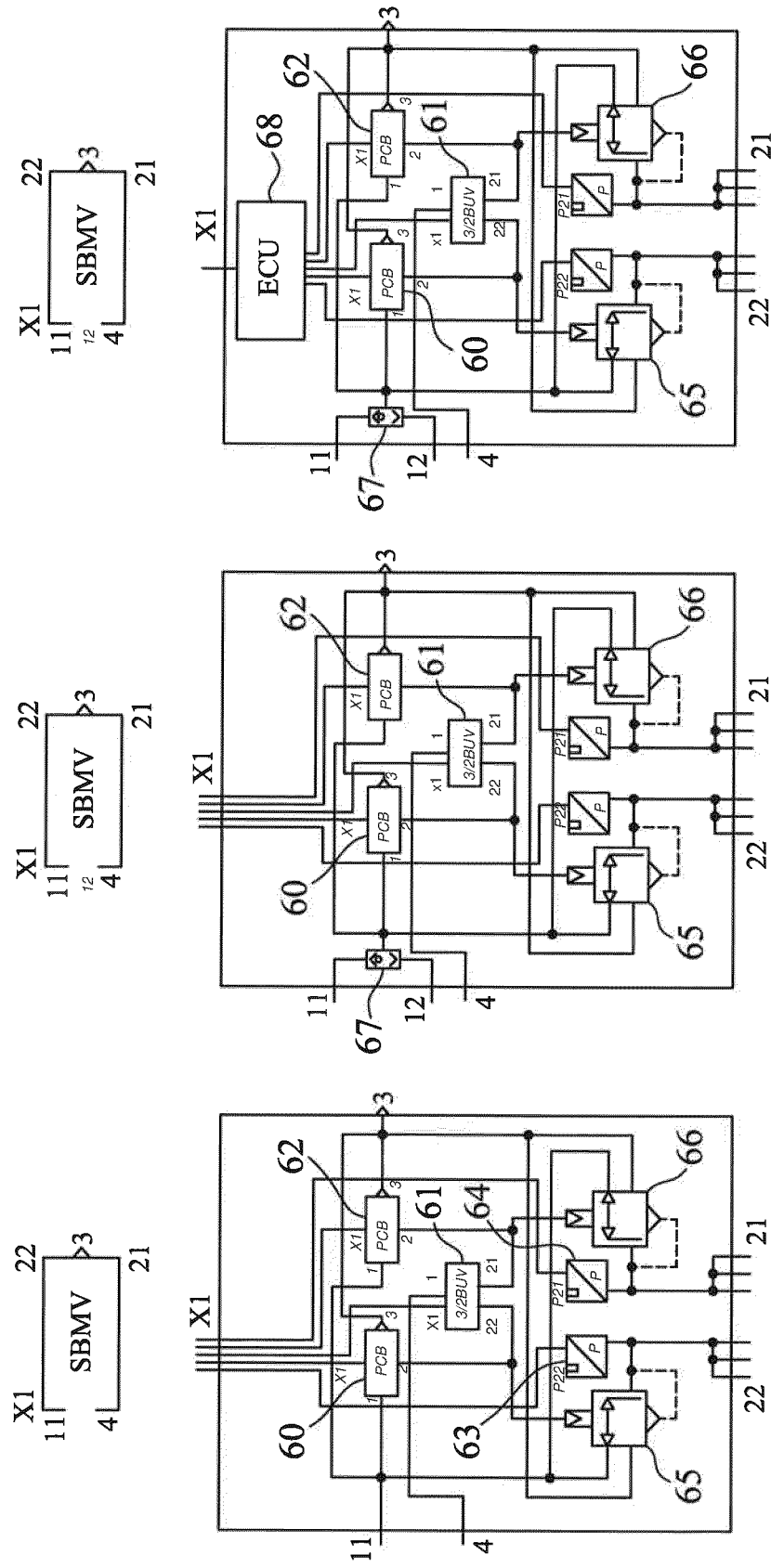
FIG. 7 shows a seventh embodiment of a trailer brake system.
FIG. 8 shows a two channel spring brake modulator.
FIG. 9 shows a further two channel spring brake modulator.

FIG. 7 shows a two channel spring brake modulator with pressure sensors and relay valves 65, 66, which receive an input pressure from the main brake line and a control pressure from the pressure control block. This could also be implemented in a single channel embodiment. In normal operation, the input port 4 is connected to the control portion of the relay valve that then in turn uses input from port 11 and the exhaust port to regulate output pressure for ports 21 and 22 respectively, which are connected to the brakes.

The advantage of using the relay valves is that control of the spring brakes and the large masses of air associated with that can be performed much faster than without relay valves. With this embodiment electronically and load dependent controlled braking as well as accurate 2-Channel ABS and RSP is possible in redundancy mode.

FIG. 8 discloses a two channel spring brake modulator valve with pressure sensors, relay valves and dual supply. This embodiment features an additional input port 12 and a select high valve 67 that joins the two input ports. The two inputs are advantageously connected to separate pneumatic circuits which provides redundancy in the case of a rupture of one of the reservoirs. With this embodiment electronically and load dependent controlled braking as well as even more accurate 2-Channel ABS and RSP is possible in redundancy mode.

FIG. 9 shows a two channel spring brake modulator valve with pressure sensors, relay valves, dual supply and integrated control. The provision of the integrated control simplified the wiring harness as fewer electrical connections are required. The integrated ECU 68 provides a simpler interface to the main ECU and integrates the pressure control logic. It can also provide wheel-speed sensor input thereby simplifying the vehicle wiring further. With this embodiment electronically and load dependent controlled braking as well as even more accurate 2-Channel ABS and RSP is possible in redundancy mode.

The invention claimed is:

1. A brake system for a trailer vehicle having a plurality of axles, each of which has a wheel end on a respective side of the vehicle, the brake system comprising:
   first and second pneumatic circuits for supplying air pressure to brakes at the wheel ends, the air pressure to the wheel ends being controllable by way of a trailer brake module having a first brake ECU being part of a trailer brake module;
   a spring brake modulator valve arrangement adapted to control pressure to spring brakes on the vehicle, which modulator valve arrangement receives an input from at least one of said first and second pneumatic circuits and a control pressure from the trailer brake module, wherein
   flow of air to the brakes is controllable either by the trailer brake module or by the spring brake modulator valve arrangement, which spring brake modulator arrangement is configured to receive electrical signals from a second ECU independently operable from the first brake ECU, wherein
   the spring brake modulator valve arrangement comprises a pressure control block, which receives a pressure supply from the main brake control line, and a back-up valve which receives a control pressure from an emergency anti-compounding valve of the trailer brake module.

2. The brake system according to claim 1, wherein the pressure control block comprises a first 2/2 valve, wherein the back-up valve in normal operation connects the input port to output channels to the brake devices, wherein in redundancy mode, the back-up valve shuts off the input port and the pressure control block can modulate output pressure.

3. The brake system according to claim 2, wherein the back-up valve is a 3/2 valve, and further comprising:
   an additional pressure control block which enables a separation of one output from another output to provide two channel braking.

4. The brake system according to claim 1, wherein pressure sensors are provided in output channels to the brake devices to enable the measurement of the output pressure and to provide a target value for a pressure control loop.

5. The brake system according to claim 1, wherein the spring brake modulator valve arrangement comprises pressure sensors and relay valves, which receive an input pressure from the main brake line and a control pressure from the pressure control block.

6. The brake system according to claim 1, wherein the spring brake modulator valve arrangement comprises pressure sensors, relay valves and a dual supply, the spring brake modulator valve arrangement having an additional input port and a select high valve that joins the two input ports.

7. The brake system according to claim 6, wherein the two input ports are connected to separate pneumatic circuits.

8. The brake system according to claim 7, wherein the spring brake modulator valve arrangement has an integrated ECU to directly control the relay valves.

9. A brake system for a trailer vehicle having a plurality of axles, each of which has a wheel end on a respective side of the vehicle, the brake system comprising:
   first and second pneumatic circuits for supplying air pressure to brakes at the wheel ends, the air pressure to the wheel ends being controllable by way of a trailer brake module having a first brake ECU being part of a trailer brake module;
   a spring brake modulator valve arrangement adapted to control pressure to spring brakes on the vehicle, which modulator valve arrangement receives an input from at least one of said first and second pneumatic circuits and a control pressure from the trailer brake module, wherein
   flow of air to the brakes is controllable either by the trailer brake module or by the spring brake modulator valve arrangement, which spring brake modulator arrangement is configured to receive electrical signals from a second ECU independently operable from the first brake ECU, the spring brake modulator valve arrangement being thereby controllable to provide brake and stability management using the spring brake modulator valve arrangement.

* * * * *